(12) United States Patent (10) Patent No.: US 12,679,300 B2

Hiraiwa et al. (45) Date of Patent: Jul. 14, 2026

(54) AIRBAG DEVICE

(71) Applicant: TOYODA GOSEI CO., LTD., Kiyosu (JP)

(72) Inventors: Takuya Hiraiwa, Kiyosu (JP); Hiromi Tamai, Kiyosu (JP); Nobuya Nakakura, Kiyosu (JP); Shun Ito, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 19/299,149

(22) Filed: Aug. 13, 2025

(65) Prior Publication Data

US 2026/0091752 A1 Apr. 2, 2026

(30) Foreign Application Priority Data

Sep. 30, 2024 (JP) ................................. 2024-170660

(51) Int. Cl.
B60R 21/217 (2011.01)
B60R 21/2338 (2011.01)

(52) U.S. Cl.
CPC ........ B60R 21/217 (2013.01); B60R 21/2338 (2013.01); *B60R 2021/23384* (2013.01)

(58) Field of Classification Search
CPC .............. B60R 21/217; B60R 21/2338; B60R 2021/23384
See application file for complete search history.

(56) References Cited

U.S. PATENT DOCUMENTS

| | | | | |
|---|---|---|---|---|
| 7,690,683 B2 * | 4/2010 | Parks | ................... | B60R 21/239 |
| | | | | 280/739 |
| 11,007,970 B2 * | 5/2021 | Hiraiwa | ............... | B60R 21/203 |
| 11,351,953 B2 * | 6/2022 | Deutschmann | ....... | B60R 21/217 |
| 11,613,227 B2 * | 3/2023 | Horton | ................ | B60R 21/2338 |
| | | | | 280/743.2 |
| 11,865,997 B2 * | 1/2024 | Kawamura | ......... | B60R 21/2035 |
| 12,325,378 B2 * | 6/2025 | Furtado | ................. | B60R 21/239 |
| 2010/0090445 A1 | 4/2010 | Williams et al. | | |
| 2023/0192026 A1 | 6/2023 | Kawamura et al. | | |
| 2024/0092307 A1 | 3/2024 | Kawamura et al. | | |
| 2025/0100500 A1 | 3/2025 | Kawamura et al. | | |

* cited by examiner

*Primary Examiner* — Jason D Shanske
*Assistant Examiner* — Tiffany L Webb
(74) *Attorney, Agent, or Firm* — Posz Law Group, PLC

(57) ABSTRACT

An airbag device mounted on a vehicle includes: an airbag that is folded and accommodated, inflated by an inflation gas, and receives the vehicle's occupant; an inflator that discharges the inflation gas; a coupling member having one end portion coupled to the airbag; an actuator that controls the airbag's inflated state by switching between holding and releasing the other end portion of the coupling member, and includes: a squib; a cap holding the other end portion; and a housing maintaining, by locking the cap, holding of the other end portion, in which the cap and the other end portion are released by operation of the squib; and a bracket holding and fixing the actuator to the vehicle, wherein the bracket includes a support portion contacting an intermediate portion between the one and the other end portions and bends and supports the coupling member when the squib does not operate.

4 Claims, 12 Drawing Sheets

AIRBAG DEVICE

CROSS-REFERENCE TO RELATED APPLICATIONS

The present application claims priority from Japanese Patent Application No. 2024-170660 of Hiraiwa et al., filed on Sep. 30, 2024, the disclosures of which are hereby incorporated into the present application by reference.

BACKGROUND

Technical Field

The present invention relates to an airbag device that receives and protects an occupant with an airbag.

Description of Related Art

Conventionally, for an airbag device, as disclosed in JP 2023-90502 A, a configuration including a coupling member having one end portion coupled to an airbag, and an actuator that holds the other end portion of the coupling member and releases the holding of the other end portion by operation has been known. The actuator switches the presence or absence of tension of the coupling member acting on the airbag by switching between holding and releasing of the holding of the coupling member as described above, thereby controlling the inflated state of the airbag.

In the configuration disclosed in JP 2023-90502 A, an intermediate portion between one end portion of the coupling member coupled to the airbag and the other end portion held by the actuator is not in contact with another member. Therefore, when the airbag is inflated in a state where the actuator does not operate, the tension of the coupling member directly acts on the actuator. In such a configuration, when gas output of an inflator that supplies inflation gas to the airbag is large, an excessive load is applied to the actuator, the actuator is deformed, and the holding state of the coupling member may be unintentionally released. Therefore, selection of the inflator is restricted.

SUMMARY

An object of the present invention is to provide an airbag device capable of reducing a load applied to an actuator from a coupling member when an airbag is inflated in a state where the actuator does not operate.

A typical configuration of the airbag device according to the present invention is as follows.

An airbag device mounted on a vehicle includes:

an airbag configured to be folded and accommodated, be inflated by being supplied with an inflation gas, and receive an occupant of the vehicle;

an inflator that discharges the inflation gas to be supplied to the airbag;

a coupling member having one end portion coupled to the airbag;

an actuator that controls an inflated state of the airbag by switching between holding and releasing of the holding of the other end portion of the coupling member, the actuator including: a squib; a cap that is disposed to face the squib and holds the other end portion of the coupling member; and a housing that maintains, by locking the cap, a state where the cap holds the other end portion, in which the locking of the cap by the housing is released by gas generated by operation of the squib, and the holding of the other end portion by the cap is released; and a bracket that holds the actuator and fixes the actuator to the vehicle including the airbag device, wherein the bracket includes a support portion that is in contact with an intermediate portion between the one end portion and the other end portion of the coupling member and supports the coupling member while bending the coupling member in a state where the squib does not operate.

DESCRIPTION OF THE PREFERRED EMBODIMENTS

Preferred embodiments of the present invention are described below with reference to accompanying drawings. However, the invention is not limited to the embodiments disclosed herein. All modifications within the appended claims and equivalents relative thereto are intended to be encompassed in the scope of the claims.

Hereinafter, an airbag device 10 according to an embodiment of the present invention will be described with reference to the drawings. Note that dimensions, materials, shapes, and the like of the components in the following description are not intended to limit the scope of the present invention only to them unless otherwise specified.

In the following description, unless otherwise specified, the left-right direction means the left direction and the right direction as viewed from an occupant M seated on a passenger seat 3 of a vehicle 1, and the front-rear direction means the front direction and the rear direction as viewed from the occupant M seated on the passenger seat 3. The upper-lower direction means the upper direction and the lower direction in the vertical direction.

Figure 1:
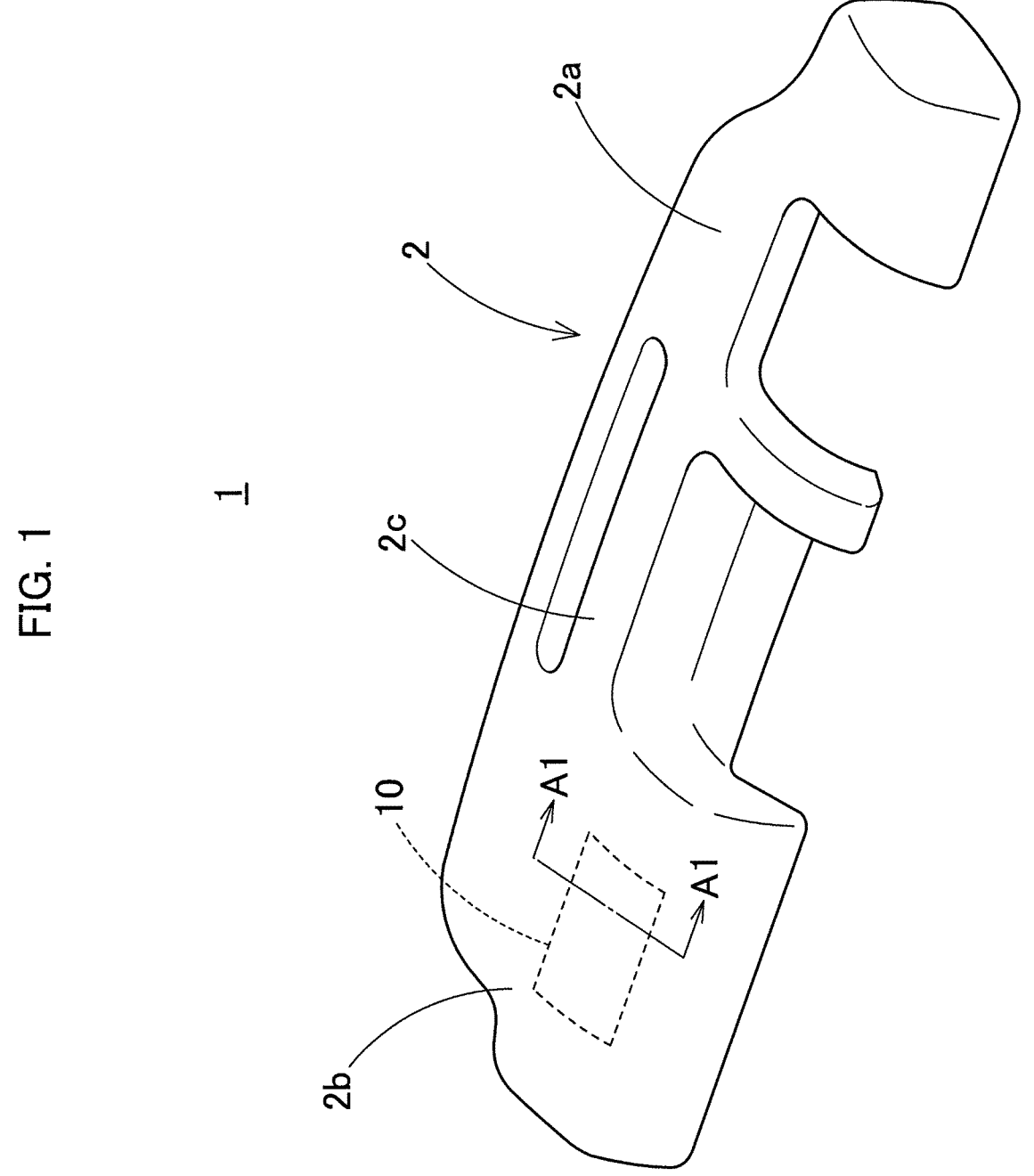
FIG. 1 is a perspective schematic view of an instrument panel.
Figure 2:
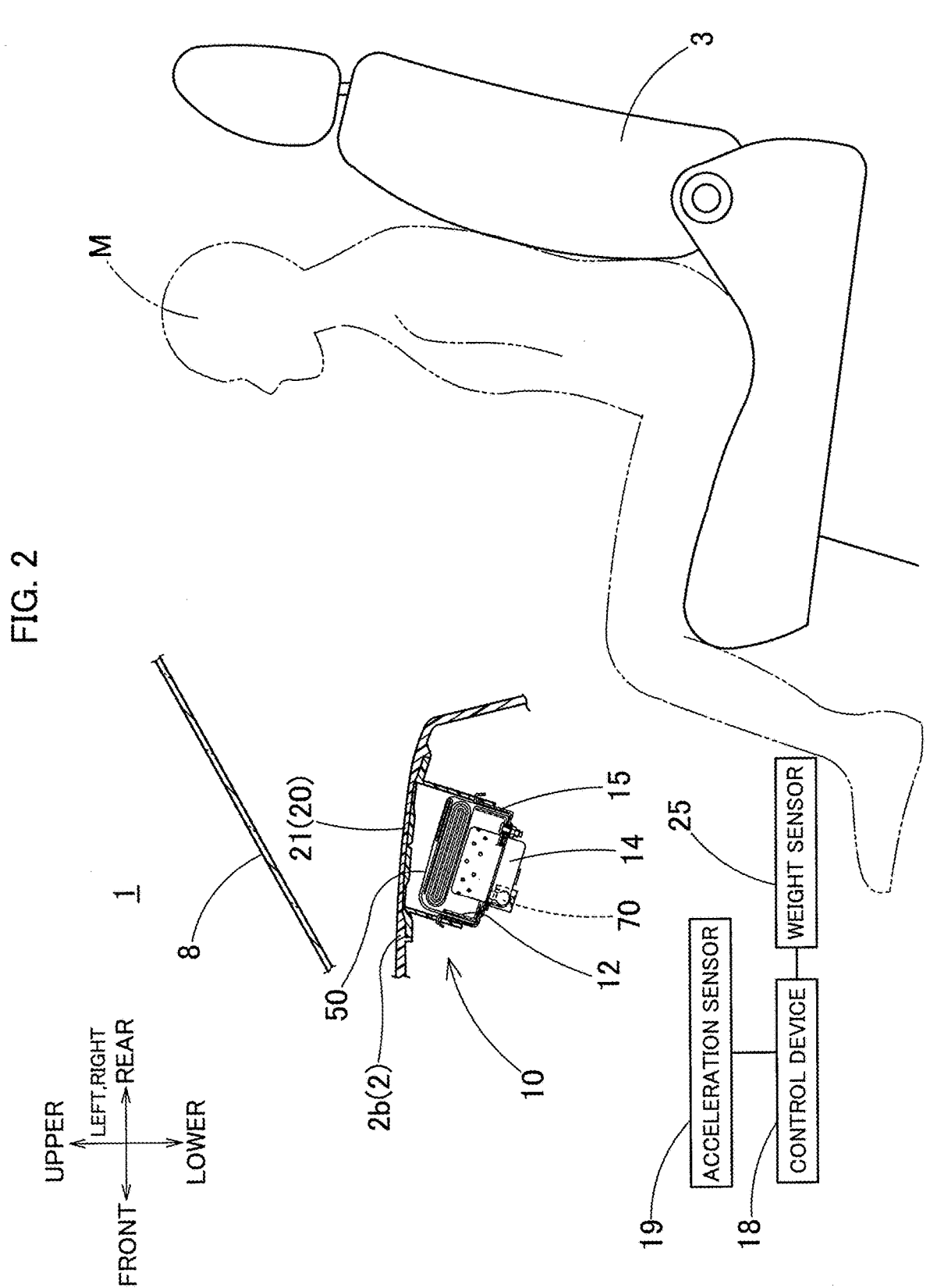
FIG. 2 is a view of surrounding components of a passenger seat of a vehicle as viewed from the left side.

FIG. 1 is a perspective schematic view of an instrument panel 2 (hereinafter referred to as "instrument panel 2") of the vehicle 1. FIG. 2 is a view of surrounding components of the passenger seat 3 of the vehicle 1 as viewed from the left side, and illustrates the instrument panel 2 and the airbag device 10 in a section taken along line A1-A1 illustrated in

3

Figure 3:
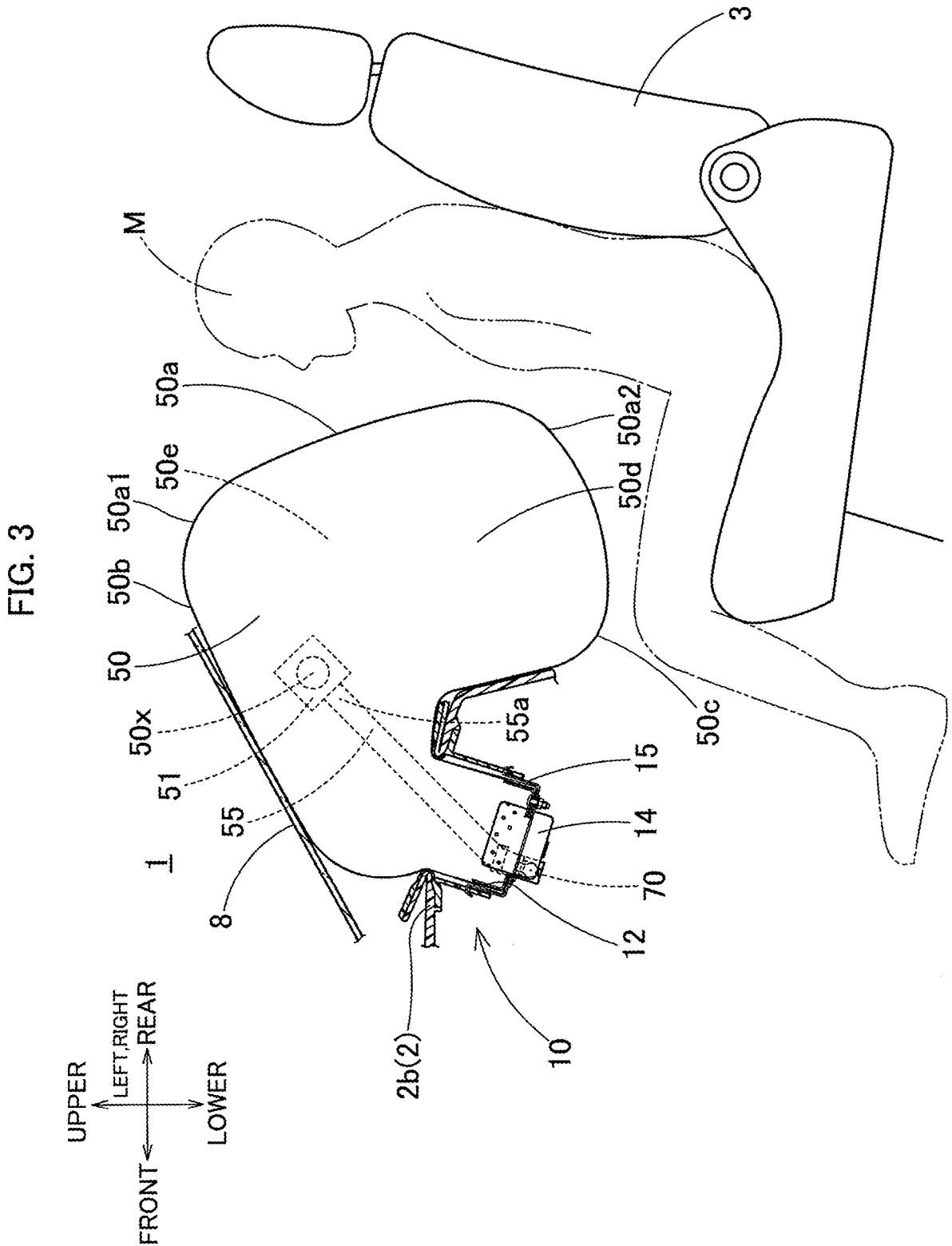
FIG. 3 is a view of the surrounding components of the passenger seat when an airbag is completely inflated as viewed from the left side.
Figure 4:
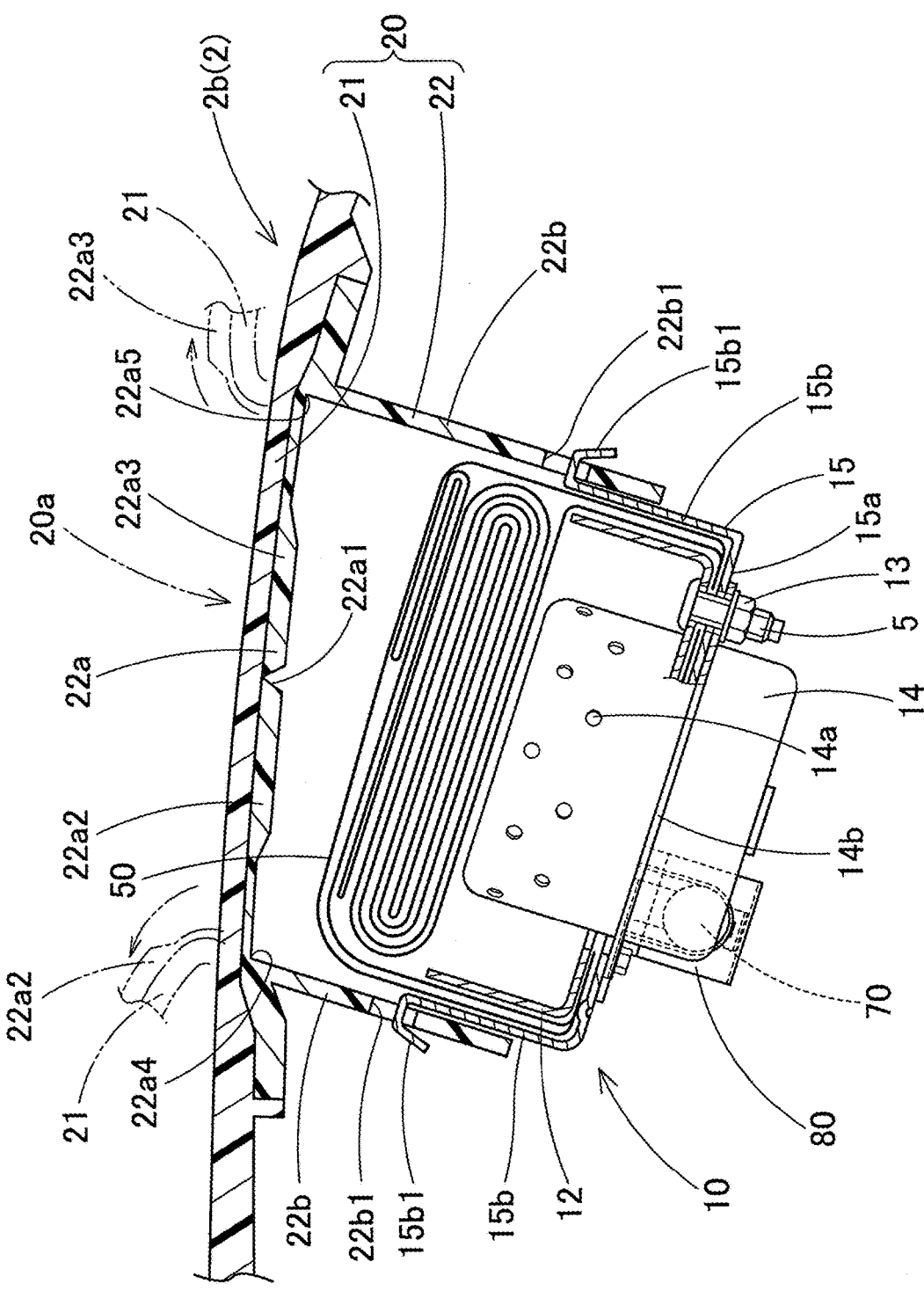
FIG. 4 is a schematic sectional view of an airbag device.
Figure 5A:
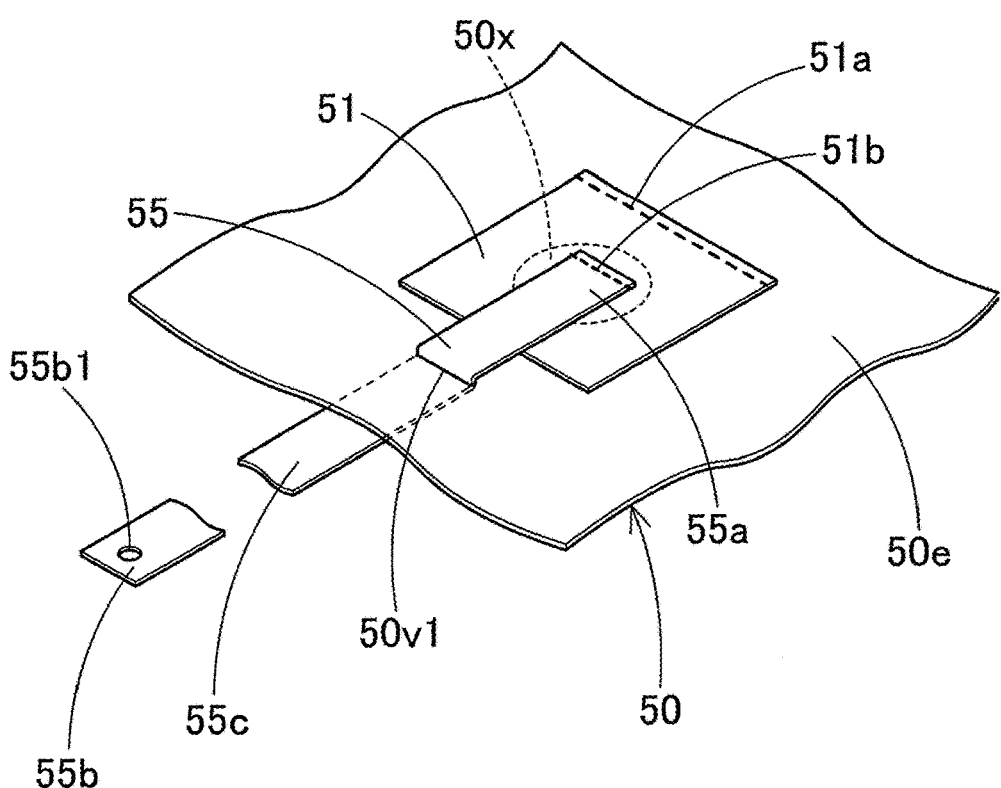
FIGS. 5A and 5B are perspective schematic views of surrounding components of a flap of the airbag.
Figure 5B:
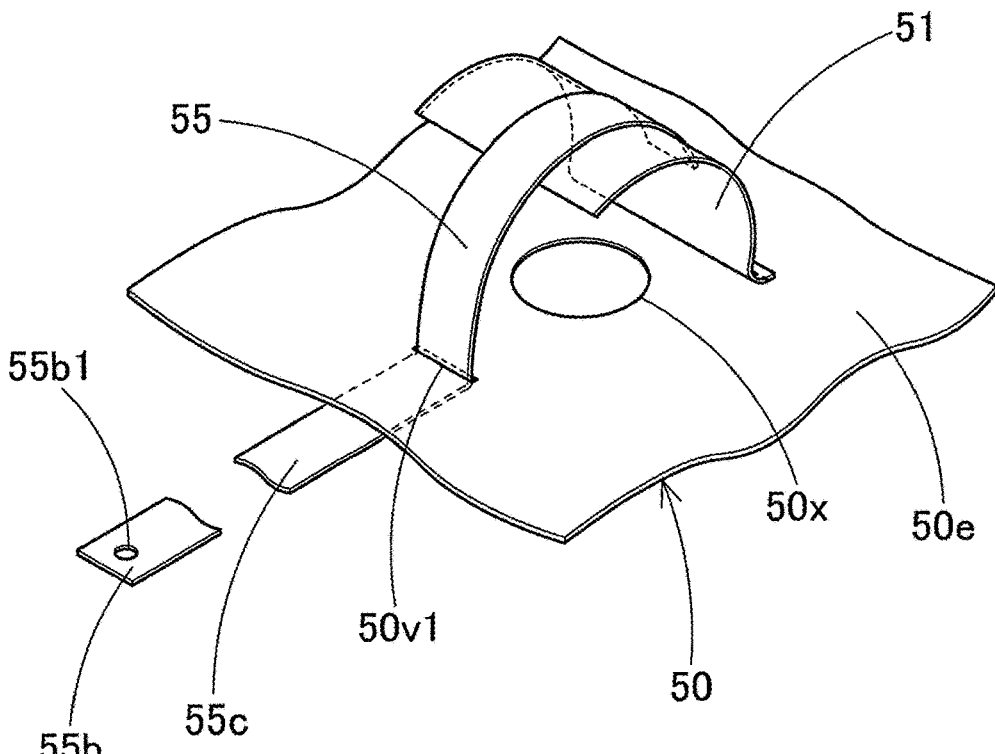

FIG. 1. FIG. 3 is a view of the surrounding components of the passenger seat 3 in a state where an airbag 50 is completely inflated as viewed from the left side, and illustrates the instrument panel 2 and the airbag device 10 in the section taken along line A1-A1 illustrated in FIG. 1. FIG. 4 is a schematic sectional view of the airbag device 10. FIGS. 5A and 5B are perspective schematic views of surrounding components of a flap 51 of the airbag 50.

The airbag device 10 of the present embodiment is mounted on the vehicle 1, and receives and protects the occupant M seated on the passenger seat 3 (seat) of the vehicle 1 with the airbag 50. As illustrated in FIGS. 1, 2, 3, 4, 5A, and 5B, the airbag 50 of the airbag device 10 is provided in the instrument panel 2 located in front of the passenger seat 3 of the vehicle 1. The instrument panel 2 includes a driver's seat side portion 2a located in front of a driver's seat (not illustrated), a passenger seat side portion 2b located in front of the passenger seat 3, and a central portion 2c in front of a center console located between the driver's seat and the passenger seat 3. The airbag 50 is provided in the passenger seat side portion 2b.

The airbag device 10 includes the airbag 50, an inflator 14 that supplies an inflation gas to the airbag 50, a case 15 that holds the airbag 50 and the inflator 14, an actuator 70 that controls exhaust of the inflation gas in the airbag 50, and an airbag cover 20 that covers the airbag 50 in a folded state. The airbag device 10 further includes a control device 18 that controls the operations of the inflator 14 and the actuator 70, an acceleration sensor 19, and a weight sensor 25.

The acceleration sensor 19 is attached at a predetermined position of a body of the vehicle 1, and detects an impact caused by a collision or the like of the vehicle 1 as acceleration. The weight sensor 25 (weight detection unit) is attached to the passenger seat 3 and detects the weight of the occupant M seated on the passenger seat 3.

The control device 18 (control unit) includes a central processing unit (CPU), a memory, and the like, is attached at a predetermined position of the body of the vehicle 1, and is electrically connected to the acceleration sensor 19, the weight sensor 25, the inflator 14, and the actuator 70 by a cable (not illustrated). The control device 18 transmits an operation signal for operating the inflator 14 to the inflator 14 according to a detection result of the acceleration sensor 19. In addition, the control device 18 transmits an operation signal for operating a squib 71 (FIG. 7) of the actuator 70 to the squib 71 according to a detection result of the weight sensor 25.

The inflator 14 is a member having a substantially cylindrical shape that generates and releases an inflation gas. The inflator 14 has, in an upper portion thereof, discharge ports 14a for discharging the inflation gas, and the portion where the discharge ports 14a are formed is disposed inside the airbag 50. The inflator 14 includes, as a portion coupled to the case 15, a flange portion 14b extending in the radial direction of the cylindrical shape from a surface in which the discharge ports 14a are formed. The inflator 14 operates by receiving an operation signal from the control device 18 to generate the inflation gas.

The airbag 50 is a bag-shaped member formed of a flexible woven fabric such as polyester yarn, and is housed inside the passenger seat side portion 2b of the instrument panel 2 in a folded state. A lower surface of the airbag 50 in the folded state has an opening (not illustrated) for inserting the portion where the discharge ports 14a of the inflator 14 are formed. A retainer 12 for fixing the airbag 50 and the inflator 14 to the case 15 is accommodated in the airbag 50.

When inflation gas is supplied from the inflator 14, the airbag 50 is inflated so as to block a space between the instrument panel 2 and a windshield 8 of the vehicle 1. Specifically, the airbag 50 in a completely inflated state includes a rear wall portion 50a that is disposed on the rear side and receives the occupant M moving forward by the impact of a collision of the vehicle 1. The airbag 50 includes an upper wall portion 50b that is disposed on the upper side, extends along the windshield 8 of the vehicle 1, and is connected to an upper end portion 50a1 of the rear wall portion 50a on the rear side, a lower wall portion 50c that is disposed on the lower side and is connected to a lower end portion 50a2 of the rear wall portion 50a on the rear side, and a left wall portion 50d and a right wall portion 50e that are disposed on the left side and the right side, respectively. The lower wall portion 50c is placed and supported on the instrument panel 2.

The right wall portion 50e of the airbag 50 is provided with an exhaust port 50x for exhausting the inflation gas excessively supplied into the airbag 50. The exhaust port 50x is covered and closed by the flap 51 (closing member) when the airbag 50 is not inflated and when the actuator 70 does not operate even if the airbag 50 is inflated.

The flap 51 is a substantially rectangular member that covers and closes the exhaust port 50x from the outside, and is formed of a woven fabric similar to the airbag 50 in the present embodiment. A portion on the rear side of the flap 51 is sewn and coupled to a portion on the rear side of the exhaust port 50x of the airbag 50 at a sewn portion 51a. A portion near the center of the flap 51 is sewn and coupled to one end portion 55a of a coupling belt 55 in the longitudinal direction at a sewn portion 51b. That is, the one end portion 55a of the coupling belt 55 is indirectly coupled to the airbag 50 via the flap 51.

The coupling belt 55 (coupling member) is a thin band-like body, and is formed of a woven fabric similar to the airbag 50 in the present embodiment. A through hole 55b1 penetrating in the thickness direction of the coupling belt 55 is formed at another end portion 55b of the coupling belt 55 in the longitudinal direction. When a cap 73 of the actuator 70 described later is inserted through the through hole 55b1, the other end portion 55b of the coupling belt 55 is held by the actuator 70. That is, the one end portion 55a of the coupling belt 55 in the longitudinal direction is coupled to the airbag 50 via the flap 51, and the other end portion 55b is held by the actuator 70.

Most of an intermediate portion 55c between the one end portion 55a and the other end portion 55b of the coupling belt 55 is disposed inside the airbag 50. Specifically, the intermediate portion 55c of the coupling belt 55 is inserted into an insertion hole 50v1 formed immediately in front of the exhaust port 50x of the airbag 50 near the one end portion 55a, enters the inside of the airbag 50, and is extracted to the outside of the airbag 50 from an insertion hole 50v2 (see FIG. 11) of the airbag 50 formed near the actuator 70 near the other end portion 55b. In this manner, most of the intermediate portion 55c of the coupling belt 55 is disposed inside the airbag 50.

The actuator 70 is fixed to the case 15 via a bracket 80, holds the other end portion 55b of the coupling belt 55 before operation, and releases the holding of the other end portion 55b of the coupling belt 55 when operation is performed. When the airbag 50 is inflated, the actuator 70 switches between a state in which the exhaust port 50x is covered and closed by the flap 51 and a state in which the exhaust port 50x is open without being covered by the flap 51 by switching between holding and releasing of the holding of the other end portion 55b of the coupling belt 55. Specifically, when the airbag 50 is inflated in a state where the actuator 70 holds the other end portion 55b of the coupling belt 55, the coupling belt 55 is pulled by the airbag 50 and the actuator 70. As a result, tension is generated in the coupling belt 55, and this tension presses the flap 51 against a portion around the exhaust port 50x of the airbag 50 to close the exhaust port 50x. Therefore, the inflation gas is not discharged from the exhaust port 50x, and the internal pressure of the airbag 50 is maintained. A detailed configuration of the actuator 70 will be described later.

On the other hand, when the airbag 50 is inflated in a state where the actuator 70 releases the holding of the coupling belt 55, tension is not generated in the coupling belt 55, and thus, the flap 51 is pushed by the inflation gas that is about to flow out from the exhaust port 50x and is opened outward. As a result, the exhaust port 50x is opened, the inflation gas is discharged from the exhaust port 50x, and the internal pressure of the airbag 50 decreases.

The case 15 includes a rectangular plate-shaped bottom wall portion 15a and a rectangular tubular side wall portion 15b extending upward from an outer edge of the bottom wall portion 15a, and is coupled to the body of the vehicle 1 by a bracket (not illustrated). In the present embodiment, the case 15 is formed of sheet metal. Hook-shaped hook portions 15b1 are formed at upper end portions, respectively, on the front side and the rear side of the side wall portion 15b. A plurality of the hook portions 15b1 are provided on each of the front side and the rear side of the side wall portion 15b so as to be aligned in the left-right direction. An insertion hole (not illustrated) through which the inflator 14 is inserted is formed in the bottom wall portion 15a.

The airbag 50 and the inflator 14 are fixed to the bottom wall portion 15a of the case 15 via the retainer 12 in the airbag 50. Specifically, a peripheral edge of the opening (not illustrated) of the airbag 50 is sandwiched between a lower surface of the retainer 12 and an upper surface of the bottom wall portion 15a of the case 15. An upper surface of the flange portion 14b of the inflator 14 is pressed against a lower surface of the bottom wall portion 15a of the case 15. In this state, a bolt 5 is inserted through a screw hole formed in each of the peripheral edge of the opening of the airbag 50, the bottom wall portion 15a of the case 15, and the flange portion 14b of the inflator 14, and a nut 13 is fastened. As a result, the airbag 50 and the inflator 14 are fixed to the bottom wall portion 15a of the case 15.

The airbag cover 20 covers an upper side of the airbag 50 in order to prevent the airbag 50 in a folded state from being exposed to the outside. In addition, the airbag cover 20 is partially broken when the airbag 50 is inflated, and forms an opening 20a through which the airbag 50 is delivered to the outside. In the present embodiment, the airbag cover 20 is formed of a synthetic resin, and includes a base material 21 and a coupling portion 22 coupled to a back surface of the base material 21 by screws or the like. The base material 21 is a member constituting the instrument panel 2 and extends to the driver's seat side portion 2a and the central portion 2c. In other words, the instrument panel 2 also serves as a part of the airbag cover 20.

The coupling portion 22 includes a top surface portion 22a which extends in a substantially horizontal direction along the base material 21 and is coupled to the back surface of the base material 21, and a substantially rectangular tubular side wall portion 22b which extends downward from the top surface portion 22a and is disposed adjacent to the side wall portion 15b of the case 15. A plurality of engagement holes 22b1 with which a plurality of the hook portions 15b1 formed on the side wall portion 15b of the case 15 respectively engage are formed in the front side and the rear side of the side wall portion 22b. The hook portions 15b1 are caught and engaged with the respective engagement holes 22b1, whereby the airbag cover 20 and the case 15 are coupled together.

A recess 22a1 recessed to decrease the thickness is formed at a central portion in the front-rear direction on the back surface of the top surface portion 22a. A front side portion of the recess 22a1 in the top surface portion 22a is a door portion 22a2 that rotates forward and upward around a corner portion 22a4 formed between the front side of the side wall portion 22b and the door portion 22a2 when the airbag 50 is inflated. Similarly, a rear side portion of the recess 22a1 in the top surface portion 22a is a door portion 22a3 that rotates rearward and upward around a corner portion 22a5 formed between the rear side of the side wall portion 22b and the door portion 22a3 when the airbag 50 is inflated.

Next, an operation when the airbag device 10 protects the occupant M will be described. First, when an impact occurs due to a collision of the vehicle 1, the acceleration sensor 19 detects the impact as acceleration. The control device 18 transmits an operation signal to the inflator 14 when the acceleration detected by the acceleration sensor 19 is equal to or greater than a predetermined value. As a result, the inflator 14 is operated, the inflation gas is supplied into the airbag 50, and the airbag 50 starts to inflate.

The airbag 50 that has started to inflate first comes into contact with the top surface portion 22a of the coupling portion 22 of the airbag cover 20 and pushes up the top surface portion 22a. As a result, the top surface portion 22a is broken starting from the fragile recess 22a1 of the top surface portion 22a, and accordingly, a portion of the base material 21 coupled to the top surface portion 22a is broken.

Next, areas near the corner portions 22a4 and 22a5 of the top surface portion 22a are deformed by the pressure received from the airbag 50, and the door portions 22a2 and 22a3 of the top surface portion 22a are pushed up by the airbag 50 together with the base material 21 broken and rotate upward, thereby forming the opening 20a. A two-dot chain line illustrated in FIG. 4 indicates a state in which the door portions 22a2 and 22a3 of the top surface portion 22a and the base material 21 are rotated upward.

Next, the airbag 50 is delivered from the opening 20a to the side of the occupant M seated on the passenger seat 3, that is, to the rear side of the vehicle 1 to complete the inflation. The occupant M moving forward with the collision of the vehicle 1 is received and protected by the rear wall portion 50a of the airbag 50 in the inflated state.

In addition, when the airbag 50 is inflated, in a case where the weight of the occupant M detected by the weight sensor 25 is equal to or greater than a predetermined value, the control device 18 does not operate the actuator 70 and maintains the state of holding the other end portion 55b of the coupling belt 55. As a result, since the exhaust port 50x is closed by the flap 51 and the internal pressure of the airbag 50 is kept high, a large occupant M is accurately received by the airbag 50.

In addition, when the airbag 50 is inflated, in a case where the weight of the occupant M detected by the weight sensor 25 is less than the predetermined value, the control device 18 operates the actuator 70 and releases the holding of the other end portion 55b of the coupling belt 55. As a result, the exhaust port 50x is opened, and the inflation gas in the airbag 50 is discharged from the exhaust port 50x. Therefore, a small occupant M is prevented from being injured by the reaction force of the airbag 50.

In the present embodiment, the operation timings of the actuator 70 and the inflator 14 are substantially the same, but the present invention is not limited thereto. That is, the actuator 70 may operate to release the holding of the other end portion 55b of the coupling belt 55 before the inflator 14 operates, or the actuator 70 may operate to release the holding of the other end portion 55b of the coupling belt 55 after the inflator 14 operates.

Figure 6:
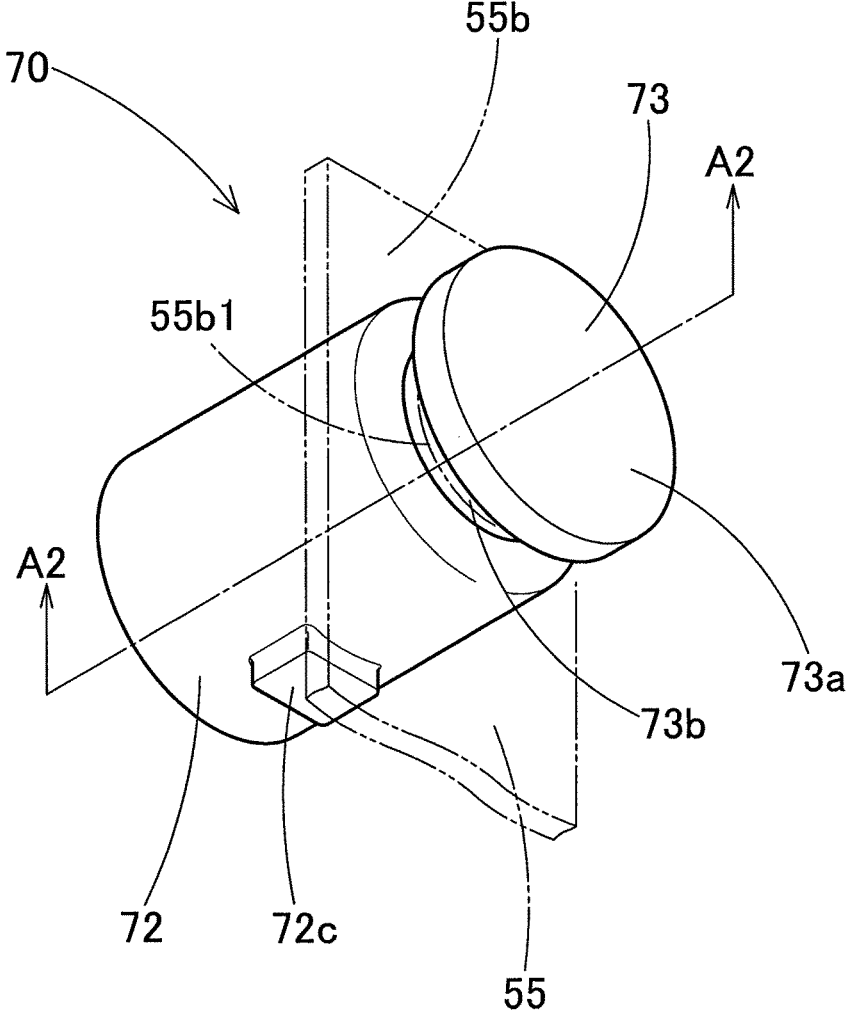
FIG. 6 is a perspective schematic view of an actuator.
Figure 7:
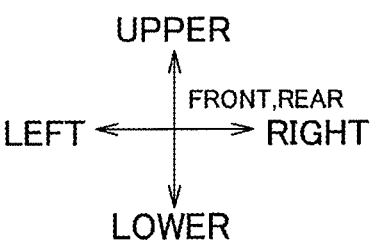
FIG. 7 is a schematic sectional view of the actuator.
Figure 7:
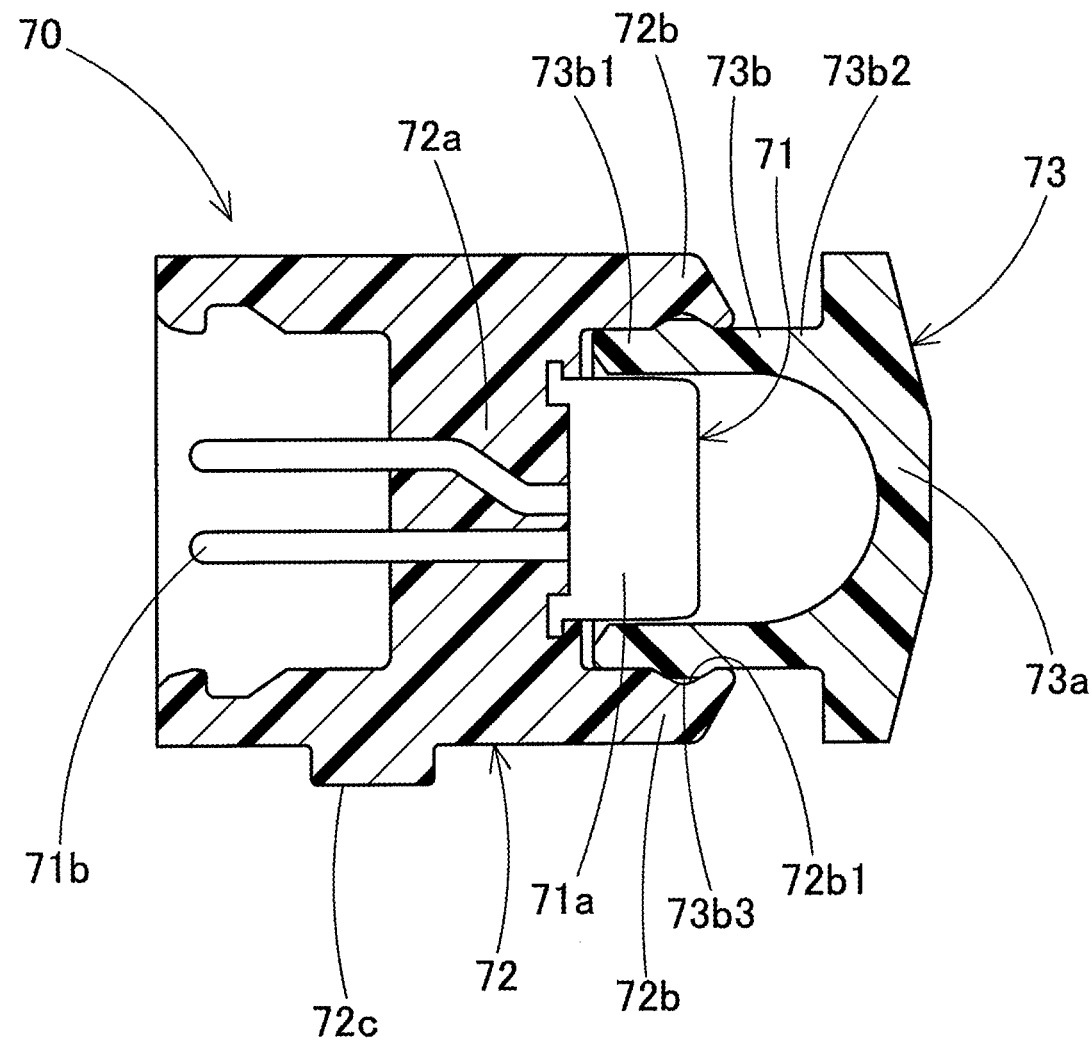

Next, a detailed configuration of the actuator 70 will be described. FIG. 6 is a perspective schematic view of the actuator 70, and the other end portion 55b of the coupling belt 55 is indicated by a two-dot chain line. FIG. 7 is a schematic sectional view of the actuator 70 taken along a line A2-A2 illustrated in FIG. 6.

As illustrated in FIGS. 6 and 7, the actuator 70 includes the squib 71, the cap 73 that is disposed to face the squib 71 and holds the other end portion 55b of the coupling belt 55, and a housing 72 that holds the squib 71 inside and locks the cap 73 to maintain a state in which the cap 73 holds the other end portion 55b of the coupling belt 55. In the present embodiment, the housing 72 and the cap 73 are made of a synthetic resin, but may be made of other materials.

The squib 71 includes a metal gas generator 71a that generates gas by operation, and a pair of conductive pins 71b to which cables (not illustrated) that electrically connect the control device 18 and the squib 71 are connected. A gas generating agent (not illustrated) is accommodated inside the gas generator 71a. The squib 71 operates in response to an operation signal from the control device 18, and burns the gas generating agent inside the gas generator 71a. As a result, the gas is released from the gas generator 71a toward the cap 73, and the locking of the cap 73 by the housing 72 is released by the gas, and the cap 73 is detached from the housing 72. As a result, the holding of the other end portion 55b of the coupling belt 55 by the cap 73 is released.

The housing 72 is a substantially round tubular member that holds the squib 71, and includes a base portion 72a that holds the squib 71. In the present embodiment, the base portion 72a of the housing 72 is integrally molded with the squib 71 by insert molding, thereby holding the gas generator 71a of the squib 71 and the conductive pins 71b. A positioning projection 72c used for positioning with the bracket 80 is provided on an outer peripheral portion of the base portion 72a of the housing 72.

The housing 72 includes a round tubular side wall portion 72b that extends from the base portion 72a toward the cap 73 and covers the side of the gas generator 71a of the squib 71 over the entire circumference with a gap. An inner peripheral portion of the side wall portion 72b is provided with a locking recess 72b1 recessed over the entire circumference. The cap 73 is locked to the locking recess 72b1 as described later.

The cap 73 holds the other end portion 55b of the coupling belt 55 and maintains a state of holding the other end portion 55b by being locked to the housing 72. The cap 73 includes a substantially disk-shaped ceiling portion 73a disposed to face the squib 71, and a substantially round tubular leg portion 73b extending from a peripheral edge of the ceiling portion 73a toward the squib 71. A tip end portion 73b1 of the leg portion 73b is inserted into the gap between the side wall portion 72b of the housing 72 and the gas generator 71a of the squib 71.

A portion exposed on a base end portion 73b2 side of the leg portion 73b without being inserted into the gap between the side wall portion 72b of the housing 72 and the gas generator 71a of the squib 71 is a portion that is inserted through the through hole 55b1 of the coupling belt 55 and holds the other end portion 55b of the coupling belt 55. The dimension of the through hole 55b1 of the coupling belt 55 is set such that the leg portion 73b can be inserted through and the ceiling portion 73a cannot be inserted through. Therefore, in a state where the cap 73 is locked to the housing 72, the through hole 55b1 does not come off the leg portion 73b, whereby the holding of the other end portion 55b of the coupling belt 55 by the cap 73 is maintained. When the locking of the cap 73 by the housing 72 is released, the leg portion 73b comes out of the through hole 55b1, and the holding of the other end portion 55b of the coupling belt 55 by the cap 73 is released.

The leg portion 73b has a locking projection 73b3 that protrudes outward from the outer peripheral surface over the entire circumference and is locked to the locking recess 72b1 of the housing 72. When the locking projection 73b3 of the leg portion 73b is fitted and locked to the locking recess 72b1 of the housing 72, the cap 73 is locked to and held by the housing 72.

Figure 8:
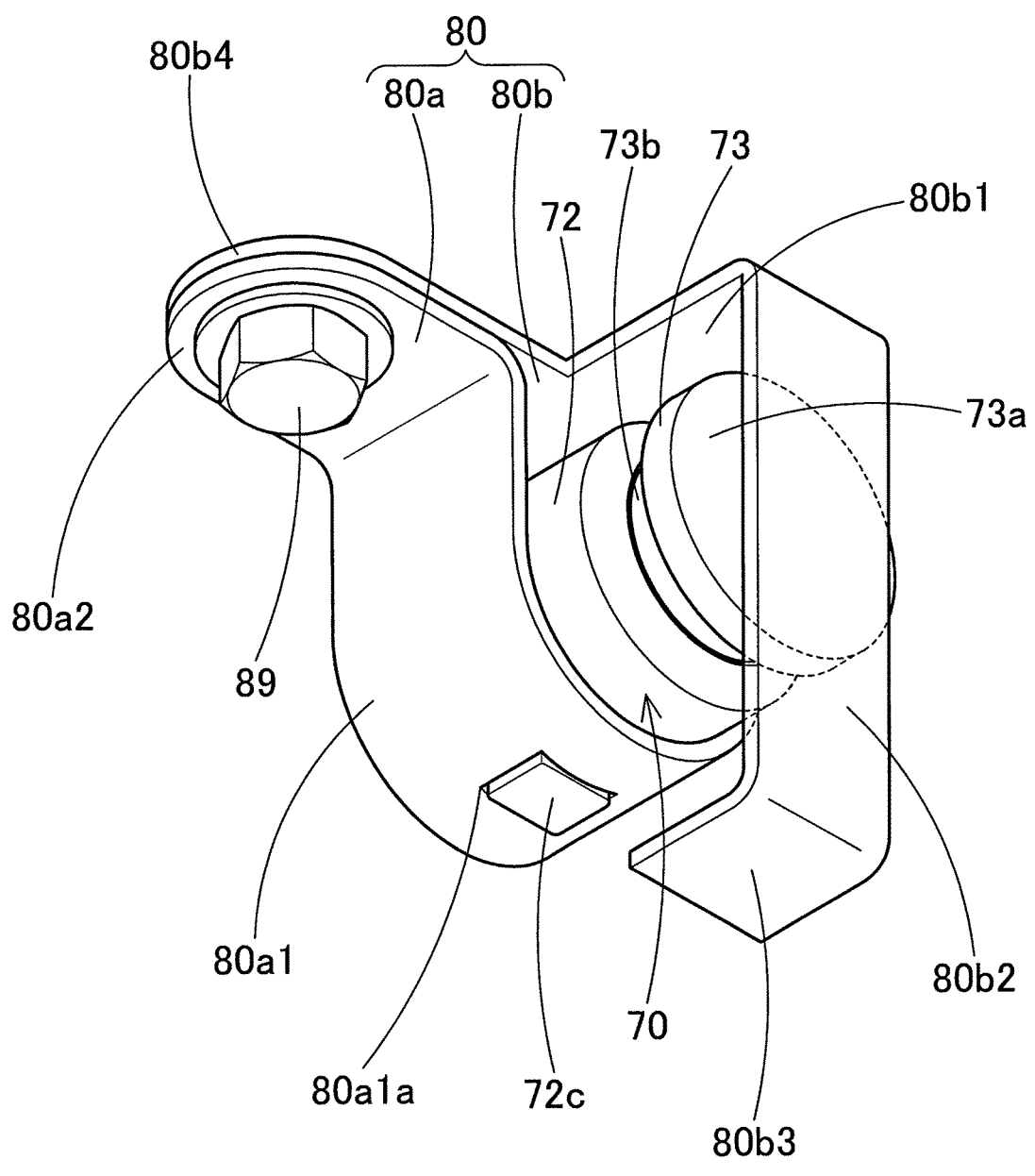
FIG. 8 is a perspective schematic view of the actuator and a bracket.
Figure 9:
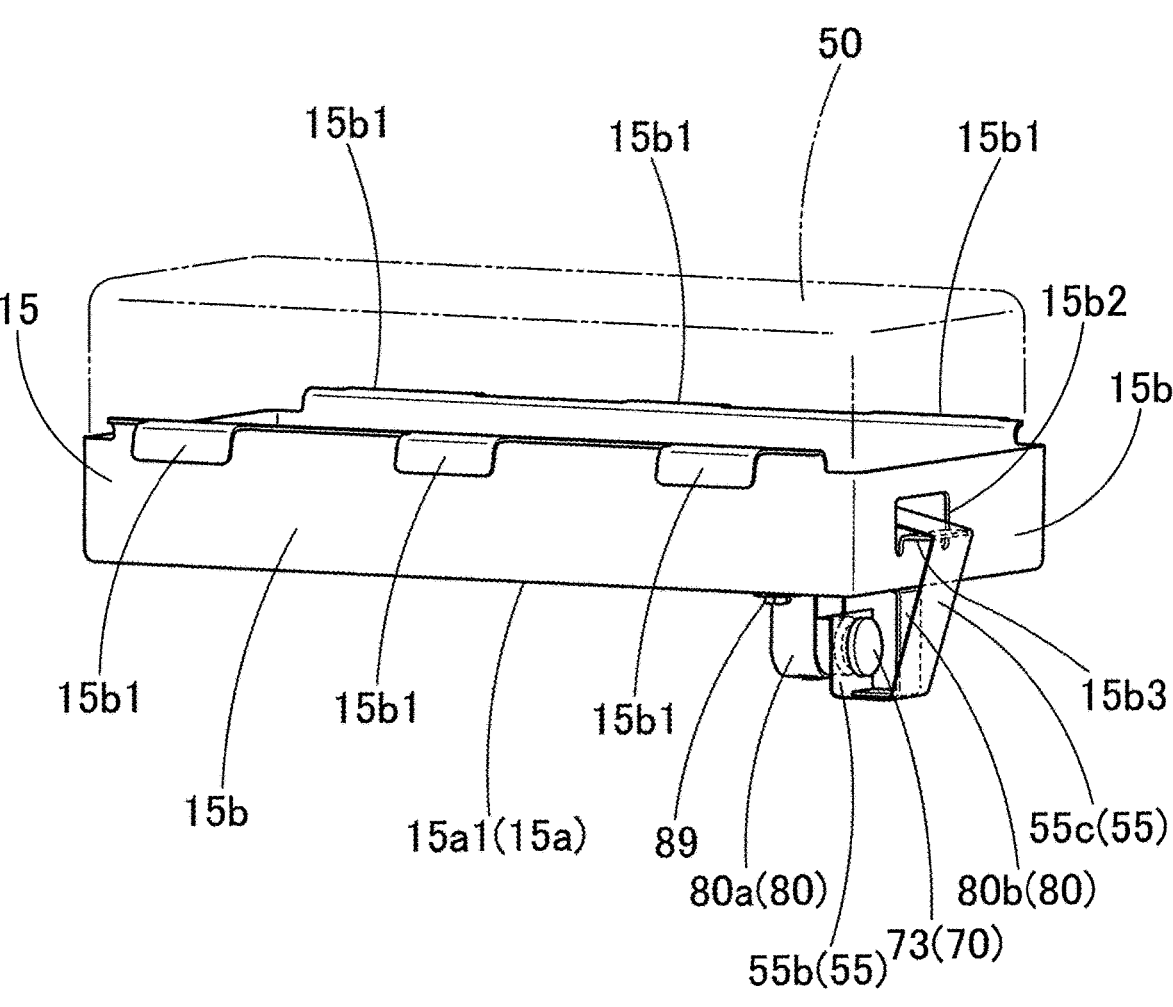
FIG. 9 is a perspective schematic view of a case.
Figure 10:
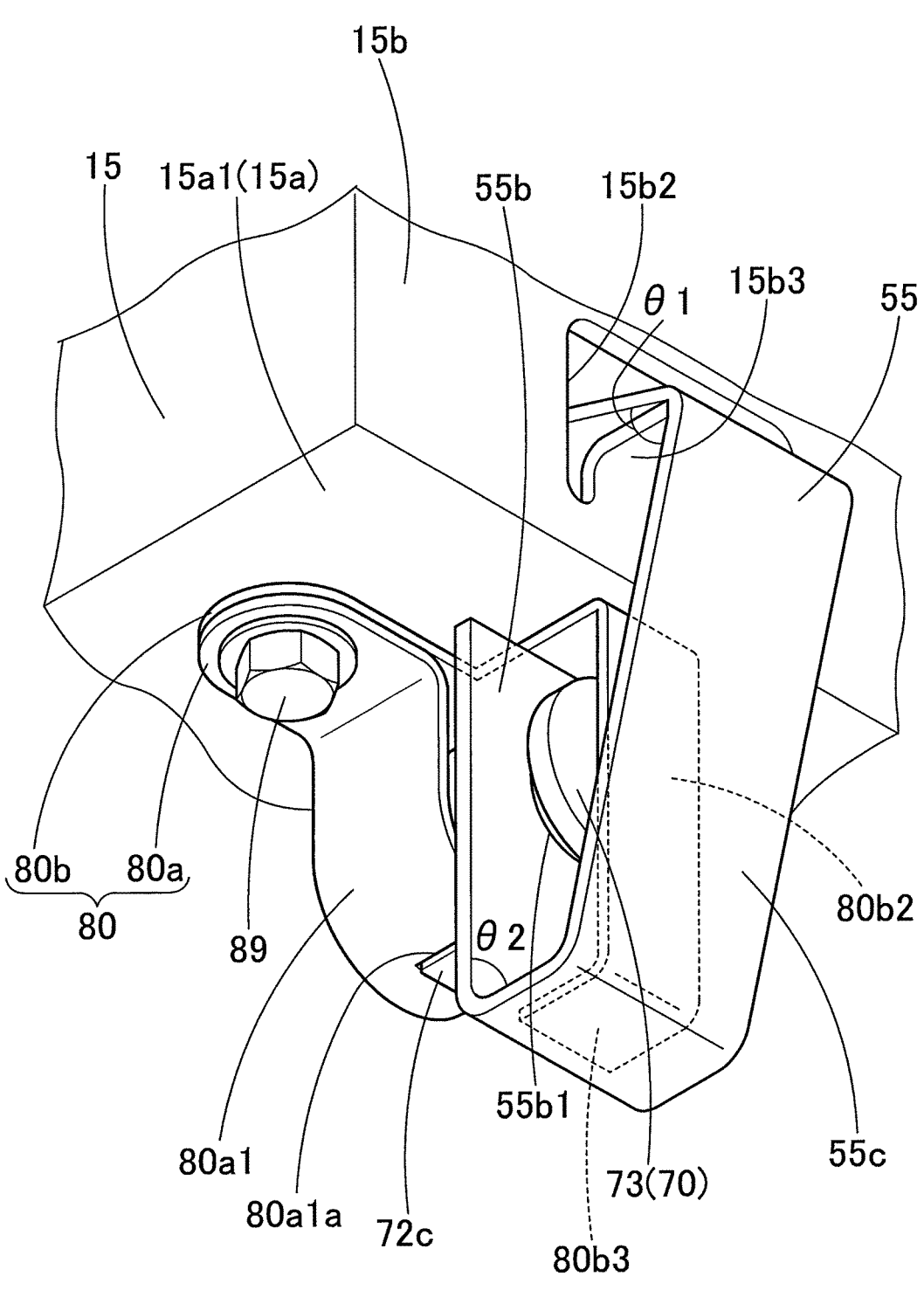
FIG. 10 is a perspective schematic view of surrounding components of the actuator in the case.
Figure 11:
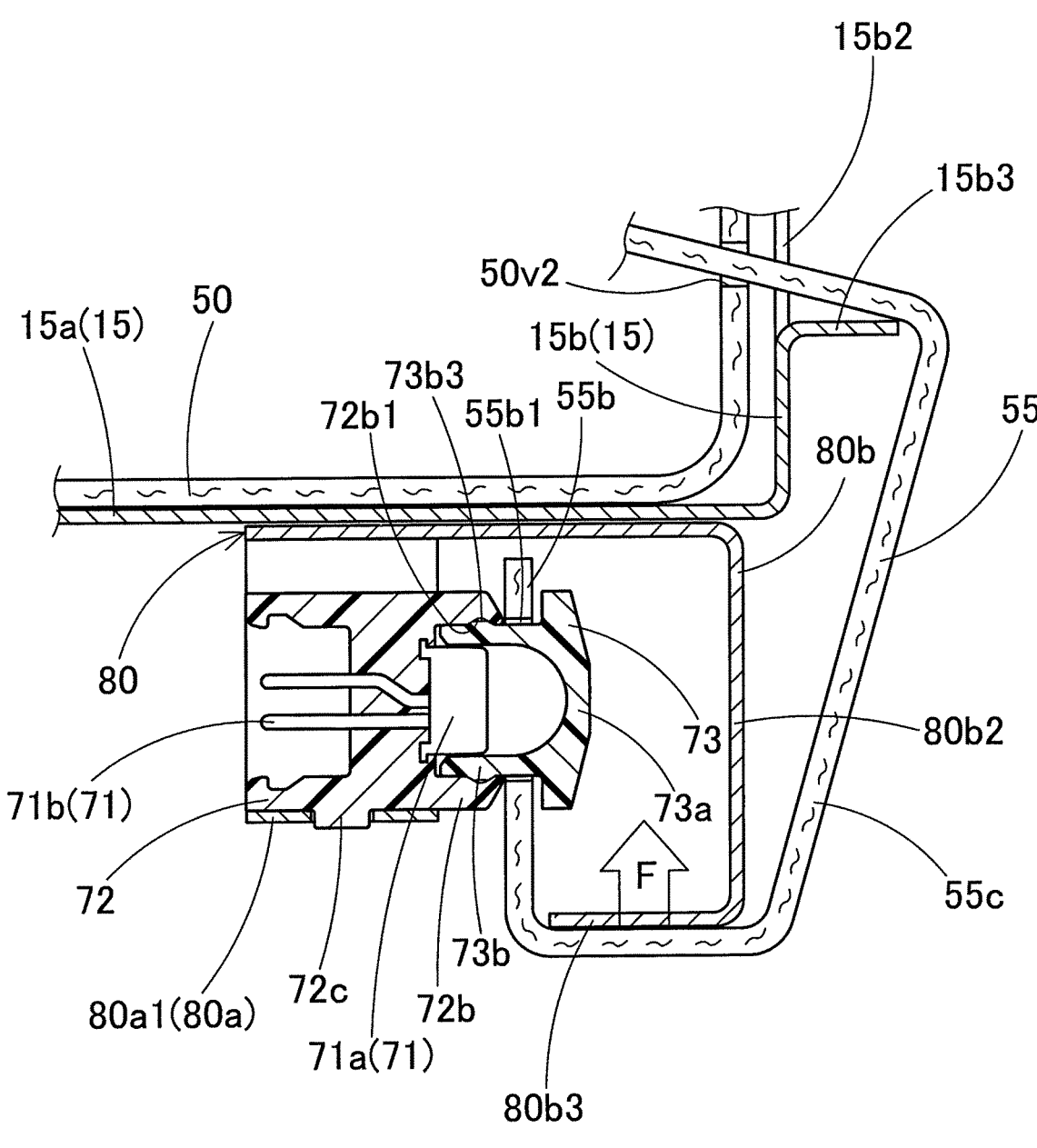
FIG. 11 is a schematic sectional view of surrounding components of the actuator when the airbag is inflated in a state where the actuator does not operate.
Figure 12:
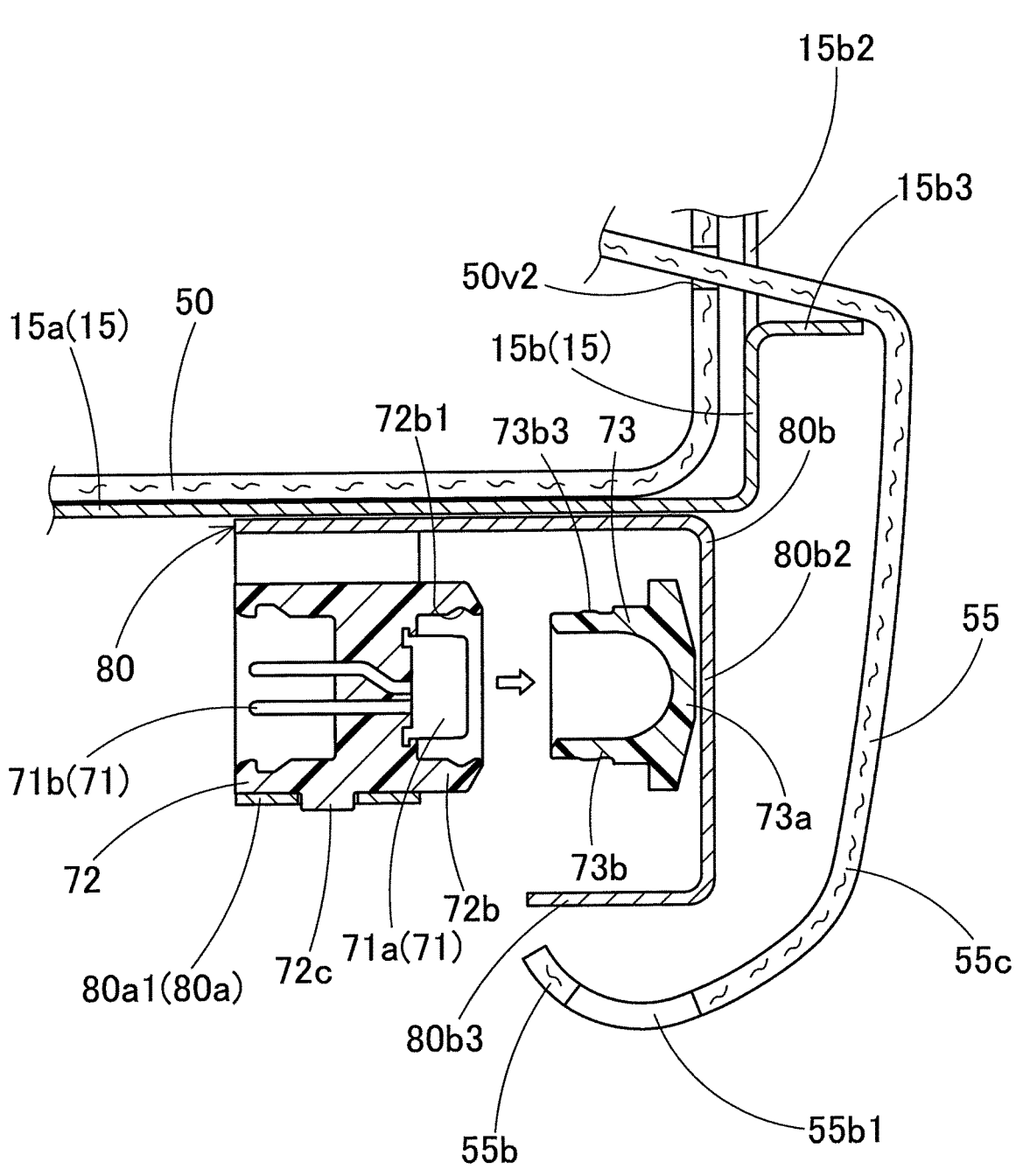
FIG. 12 is a schematic sectional view of the surrounding components of the actuator when the airbag is inflated in a state where the actuator operates.

Next, an attachment configuration of the actuator 70 onto the case 15 will be described. FIG. 8 is a perspective schematic view of the actuator 70 and the bracket 80. FIG. 9 is a perspective schematic view of the case 15. FIG. 10 is a perspective schematic view of surrounding components of the actuator 70 on the case 15. FIG. 11 is a schematic sectional view of surrounding components of the actuator 70 when the airbag 50 is inflated in a state where the actuator 70 does not operate. FIG. 12 is a schematic sectional view of the surrounding components of the actuator 70 when the airbag 50 is inflated in a state where the actuator 70 operates.

The bracket 80 is a member that fixes the actuator 70 to the case 15. As illustrated in FIG. 8, the bracket 80 is configured by coupling, by a bolt 89, two sheet metals of a housing holding plate 80a that holds the housing 72 of the actuator 70 and a belt support plate 80b that supports the coupling belt 55. The bracket 80 is not necessarily formed of a sheet metal, and may be formed of another material such as a synthetic resin. Further, the housing holding plate 80a and the belt support plate 80b may be integrally molded.

The housing holding plate 80a includes a winding portion 80a1 having a substantially U shape wound around an outer peripheral portion of the housing 72 to hold the housing 72, and an attachment portion 80a2 extending in a planar shape from a portion near an opening of the U shape of the winding portion 80a1. The winding portion 80a1 is provided with a fitting hole 80a1a into which the positioning projection 72c of the housing 72 is fitted. When the positioning projection 72c of the housing 72 is fitted into the fitting hole 80a1a of the winding portion 80a1, the positions of the housing 72 and the bracket 80 are determined. The attachment portion 80a2 has a screw hole (not illustrated) through which the bolt 89 is inserted.

The belt support plate 80b includes a base portion 80b1 that is in contact with an upper surface of the housing 72 and sandwiches the housing 72 in the upper-lower direction together with the winding portion 80a1 of the housing holding plate 80a, and a cap facing portion 80b2 extending downward from the right end of the base portion 80b1. The cap facing portion 80b2 is disposed facing the cap 73 at a position opposite to the squib 71 with respect to the cap 73.

The belt support plate 80b includes a belt hooking portion 80b3 (support portion) that is bent leftward from the lower end of the cap facing portion 80b2 and is in contact with the coupling belt 55 to support the coupling belt 55, and an attachment portion 80b4 that extends forward from the left end of the base portion 80b1 and has a screw hole (not illustrated) through which the bolt 89 is inserted. The belt hooking portion 80b3 comes into contact with a portion of the intermediate portion 55c of the coupling belt 55 in the vicinity of the other end portion 55b to support the intermediate portion 55c while bending the intermediate portion.

As illustrated in FIGS. 9 and 10, the bracket 80 is fixed to the lower surface 15a1 of the bottom wall portion 15a of the case 15 by the bolt 89 and a nut (not illustrated). In this manner, the actuator 70 is attached to the bottom wall portion 15a of the case 15 via the bracket 80.

As described above, the coupling belt 55 comes out of the airbag 50 from the insertion hole 50v2 of the airbag 50. The coupling belt 55 comes out of the case 15 through a belt insertion hole 15b2 (insertion hole) formed in the side wall portion 15b of the case 15 by a cutting and raising process. In the side wall portion 15b of the case 15, a belt hooking portion 15b3 (belt support portion) is formed to extend from a lower edge of the belt insertion hole 15b2 to the insertion direction of the coupling belt 55 with respect to the belt insertion hole 15b2 and to the outside of the case 15. The belt hooking portion 15b3 is a portion cut and raised by the cutting and raising process when the belt insertion hole 15b2 of the side wall portion 15b is formed.

The intermediate portion 55c of the coupling belt 55 that has come out of the case 15 is hooked around the belt hooking portion 15b3 and supported by the belt hooking portion 15b3 while being bent downward, and then hooked around the belt hooking portion 80b3 of the bracket 80 and supported by the belt hooking portion 15b3 while being bent leftward and upward. In this state, the other end portion 55b of the coupling belt 55 is held by the cap 73 of the actuator 70. In the present embodiment, in a state where the inflator 14 and the squib 71 do not operate, a bending angle θ1 of the coupling belt 55 formed by the supporting by the belt hooking portion 15b3 of the case 15 and a bending angle θ2 of the coupling belt 55 formed by the supporting by the belt hooking portion 80b3 of the bracket 80 are each set to 90 degrees or smaller.

As described above, the belt hooking portion 80b3 of the bracket 80 comes into contact with the intermediate portion 55c of the coupling belt 55 and supports the intermediate portion 55c while bending the intermediate portion 55c, thereby obtaining the following effect. That is, in a case where the intermediate portion 55c of the coupling belt 55 is not in contact with another member, if the airbag 50 is inflated in a state where the actuator 70 is not operating, the tension of the coupling belt 55 directly acts on the cap 73 of the actuator 70. In such a configuration, when the gas output of the inflation gas of the inflator 14 is large, an excessive load is applied to the cap 73 of the actuator 70, the cap 73 is deformed, and the holding state of the coupling belt 55 by the cap 73 may be unintentionally released. Therefore, selection of the inflator 14 is restricted.

On the other hand, in the present embodiment, the belt hooking portion 80b3 of the bracket 80 comes into contact with the intermediate portion 55c of the coupling belt 55 to support the intermediate portion 55c while bending the intermediate portion 55c. Therefore, as illustrated in FIG. 11, when the airbag 50 is inflated in a state where the actuator 70 does not operate, part of the tension F of the coupling belt 55 is applied to the belt hooking portion 80b3 arranged in the vicinity of the other end portion 55b of the coupling belt 55, whereby the tension of the coupling belt 55 acting on the cap 73 can be reduced. Therefore, with the airbag device 10 of the present embodiment, it is possible to reduce the load applied from the coupling belt 55 to the actuator 70 when the airbag 50 is inflated in a state where the actuator 70 does not operate.

In addition, the case 15 includes the belt hooking portion 15b3 that is in contact with the intermediate portion 55c of the coupling belt 55 and supports the intermediate portion 55c of the coupling belt 55 while bending the intermediate portion 55c. Therefore, when the airbag 50 is inflated in a state where the actuator 70 does not operate, part of the tension of the coupling belt 55 can be applied to the belt hooking portion 15b3, and the tension of the coupling belt 55 acting on the cap 73 can be further reduced.

Further, the bending angle θ1 of the coupling belt 55 formed by the supporting by the belt hooking portion 15b3 of the case 15 and the bending angle θ2 of the coupling belt 55 formed by the supporting by the belt hooking portion 80b3 of the bracket 80 are each set to 90 degrees or smaller. Therefore, as compared with the configuration in which the bending angles θ1 and θ2 are larger than 90 degrees, the tension of the coupling belt 55 is easily applied to these portions, and the tension of the coupling belt 55 acting on the cap 73 is easily reduced.

Further, since the belt hooking portion 15b3 is a portion cut and raised by a cutting and raising process at the time of forming the belt insertion hole 15b2 of the side wall portion 15b, the belt hooking portion 15b3 can be easily formed without separately providing the belt hooking portion 15b3. If this point is not taken into consideration, the case 15 does not need to be made of metal, and may be made of another material such as a synthetic resin.

As illustrated in FIG. 12, when the actuator 70 operates, gas is released from the gas generator 71a of the squib 71. As a result, along with the wind pressure of the gas and an increase in the internal pressure of a space defined by the gas generator 71a and the leg portion 73b, the locking of the locking projection 73b3 of the cap 73 by the locking recess 72b1 of the housing 72 is released, and the cap 73 is detached from the housing 72 and ejected to the side opposite to the squib 71. At this time, in the present embodiment, since the bracket 80 has the cap facing portion 80b2, the ejected cap 73 is received by the cap facing portion 80b2, whereby further ejection of the cap 73 can be suppressed.

Although the configuration in which the actuator 70 is fixed to the bottom wall portion 15a of the case 15 of the airbag device 10 by the bracket 80 has been described in the present embodiment, the present invention is not limited thereto. That is, the member fixed by the bracket 80 of the actuator 70 is not limited to the case 15, and only needs to be fixed to any member of the vehicle 1 including other members of the airbag device 10.

In the present embodiment, the configuration in which the one end portion 55a of the coupling belt 55 is indirectly coupled to the airbag 50 via the flap 51 has been described. However, the present invention is not limited thereto, and the one end portion 55a of the coupling belt 55 may be directly coupled to the right wall portion 50e of the airbag 50 or the like. That is, the one end portion 55a of the coupling belt 55 being coupled to the airbag 50 herein includes a configuration in which the one end portion 55a of the coupling belt 55 is indirectly coupled to the airbag 50 via another member and a configuration in which the one end portion 55a is directly coupled to the airbag 50 without interposing another member.

Further, in the present embodiment, the configuration in which the opening and closing of the exhaust port 50x of the airbag 50 is controlled by the actuator 70 has been described, but the present invention is not limited thereto. That is, as long as the actuator 70 is configured to control the inflated state of the airbag 50 by switching between holding and releasing of the holding of the other end portion 55*b* of the coupling belt 55, the actuator 70 may be used for other purposes. For example, even in a configuration in which the one end portion 55*a* of the coupling belt 55 is directly coupled to the right wall portion 50*e* of the airbag 50 and the holding and releasing of the holding of the other end portion 55*b* of the coupling belt 55 by the actuator 70 are switched to change the volume and shape of the airbag 50 at the time of completion of inflation, the same effects as described above can be obtained.

In the present embodiment, the airbag device 10 including the airbag 50 provided in the instrument panel 2 is exemplified, but the present invention is not limited thereto. That is, even if the airbag device 10 and the airbag 50 are provided at other positions of the vehicle 1, the same effects as described above can be obtained. For example, even if an airbag corresponding to the airbag 50 is provided on a steering wheel (not illustrated) in front of the driver's seat, the same effects as described above can be obtained.

What is claimed is:

1. An airbag device mounted on a vehicle, the airbag device comprising:

an airbag configured to be folded and accommodated, be inflated by being supplied with an inflation gas, and receive an occupant of the vehicle;

an inflator that discharges the inflation gas to be supplied to the airbag;

a coupling member having one end portion coupled to the airbag;

an actuator that controls an inflated state of the airbag by switching between holding and releasing of the holding of the other end portion of the coupling member, the actuator including: a squib; a cap that is disposed to face the squib and holds the other end portion of the coupling member; and a housing that maintains, by locking the cap, a state where the cap holds the other end portion, in which the locking of the cap by the housing is released by gas generated by operation of the squib, and the holding of the other end portion by the cap is released; and a bracket that holds the actuator and fixes the actuator to the vehicle including the airbag device, wherein the bracket includes a support portion that is in contact with an intermediate portion between the one end portion and the other end portion of the coupling member and supports the coupling member while bending the coupling member in a state where the squib does not operate, the airbag device includes a case that houses the airbag in a folded state and to which the bracket is fixed, and the case includes a belt support portion that is in contact with the intermediate portion of the coupling member and supports the coupling member while bending the coupling member.

2. The airbag device according to claim 1, wherein the case is made of metal, and has a through hole through which the coupling member is inserted, the through hole being formed by a cutting and raising process, and the belt support portion is a portion of the case cut and raised by the cutting and raising process.

3. The airbag device according to claim 1, wherein the bracket includes a cap facing portion disposed to face the cap at a position opposite to the squib with respect to the cap.

4. The airbag device according to claim 1, wherein the one end portion of the coupling member is coupled to the airbag via a closing member that closes an exhaust port for discharging the inflation gas from the airbag, and the exhaust port is closed by the closing member when the airbag is inflated in a state where the cap holds the other end portion of the coupling member, and the exhaust port is opened without being closed by the closing member when the airbag is inflated in a state where the cap releases the holding of the other end portion of the coupling member.

\* \* \* \* \*